United States Patent [19]

Kasahara et al.

[11] Patent Number: 5,206,762
[45] Date of Patent: Apr. 27, 1993

[54] VISCOELASTIC SUBSTANCE AND OBJECTIVE LENS DRIVING APPARATUS WITH THE SAME

[75] Inventors: Akihiro Kasahara, Kawasaki; Akira Yamada; Takashi Yoshizawa, both of Yokohama; Katsutoshi Wada, Kawasaki; Hideo Yamasaki, Yokohama, all of Japan

[73] Assignee: Kabushiki Kaisha Toshiba, Kawasaki, Japan

[21] Appl. No.: 442,578

[22] Filed: Nov. 29, 1989

[30] Foreign Application Priority Data

Dec. 1, 1988 [JP] Japan ............................ 63-302203

[51] Int. Cl.⁵ .......................... G02B 7/02; G11B 7/00
[52] U.S. Cl. .................................... 359/814; 359/824; 369/44.15
[58] Field of Search ............ 350/252, 247-257; 369/44.15-44.32, 44.14-44.17; 252/62.51-62.55

[56] References Cited

U.S. PATENT DOCUMENTS

| | | | |
|---|---|---|---|
| 4,419,614 | 12/1983 | Kimura | 359/814 |
| 4,479,051 | 10/1984 | Musha | 359/814 |
| 4,592,037 | 5/1986 | Ohnuki | 369/44.15 |
| 4,600,323 | 7/1986 | Harada et al. | 252/62.53 |
| 4,613,202 | 9/1986 | Kuriyama | 369/44.15 |
| 4,620,933 | 11/1986 | Ochiai et al. | 252/62.53 |
| 4,673,997 | 6/1987 | Gowda et al. | 252/62.53 |
| 4,689,163 | 8/1987 | Yamashita et al. | 252/62.54 |
| 4,766,583 | 8/1988 | Oinoue et al. | 369/44.16 |
| 4,773,062 | 9/1988 | Wada et al. | 369/44.16 |
| 4,878,214 | 10/1989 | Hinotani | 369/44.15 |
| 4,948,230 | 8/1990 | Kasahara et al. | 350/255 |

FOREIGN PATENT DOCUMENTS

| | | | |
|---|---|---|---|
| 55-70005 | 5/1980 | Japan . | |
| 109037 | 6/1985 | Japan | 350/247 |
| 61-257180 | 11/1986 | Japan . | |
| 62-45006 | 2/1987 | Japan . | |
| 1550895 | 8/1979 | United Kingdom . | |

OTHER PUBLICATIONS

Soviet Inventions Illustrated, Sections P, Q, week 8643, Dec. 3, 1986, Derwent Publications Ltd., London, Q 49 SU 1216-327 (Oil Gas Res Inst).

Primary Examiner—Bruce Y. Arnold
Assistant Examiner—Thong Nguyen
Attorney, Agent, or Firm—Oblon, Spivak, McClelland, Maier & Neustadt

[57] ABSTRACT

An objective lens driving apparatus includes an objective lens held by a movable member. The movable member is supported on a base by a support mechanism to be movable in a predetermined direction. Magnetic field forming unit is fixed to the base so as to apply a magnetic field to the movable member. Focusing coils and tracking coils are fixed to the movable member to drive the movable member in the predetermined direction in cooperation with the magnetic field. Viscoelastic substances for absorbing vibration of the movable member are arranged between the focusing coils and the magnetic unit and between the tracking coils and the unit. The viscoelastic substance has a viscoelastic material and magnetic material dispersed therein.

24 Claims, 9 Drawing Sheets

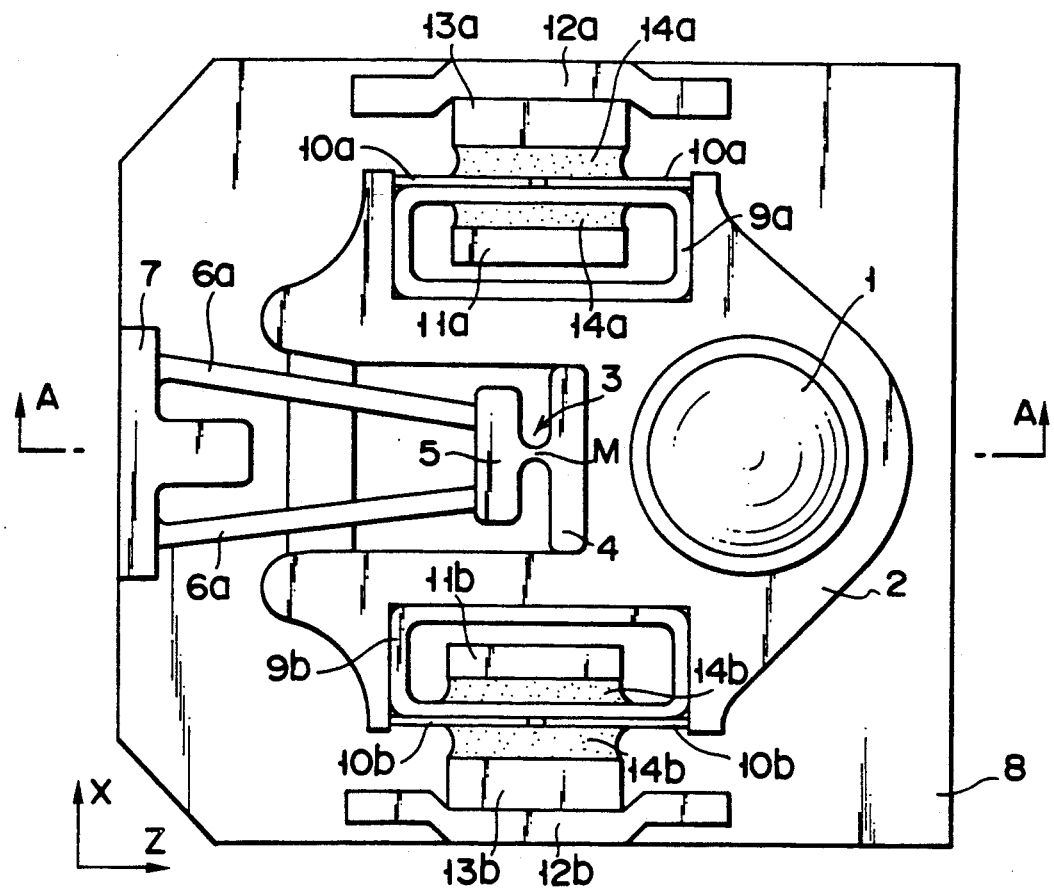
F I G. 1
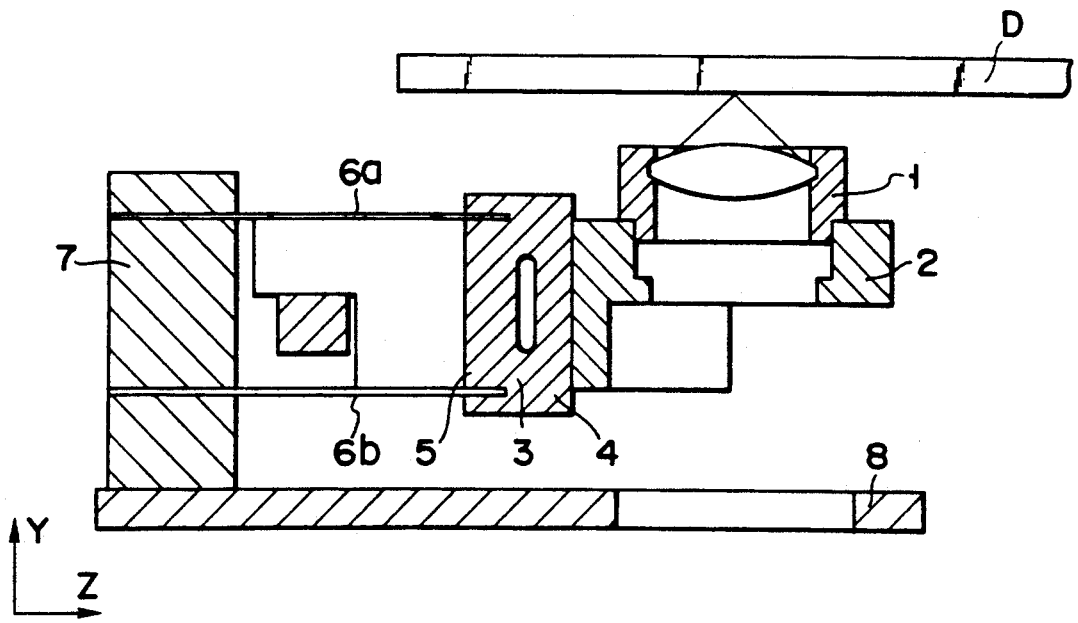
F I G. 2

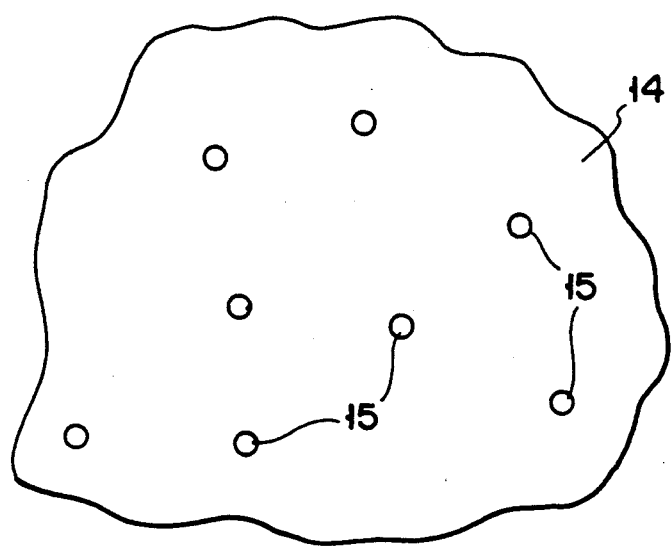
F I G. 4A
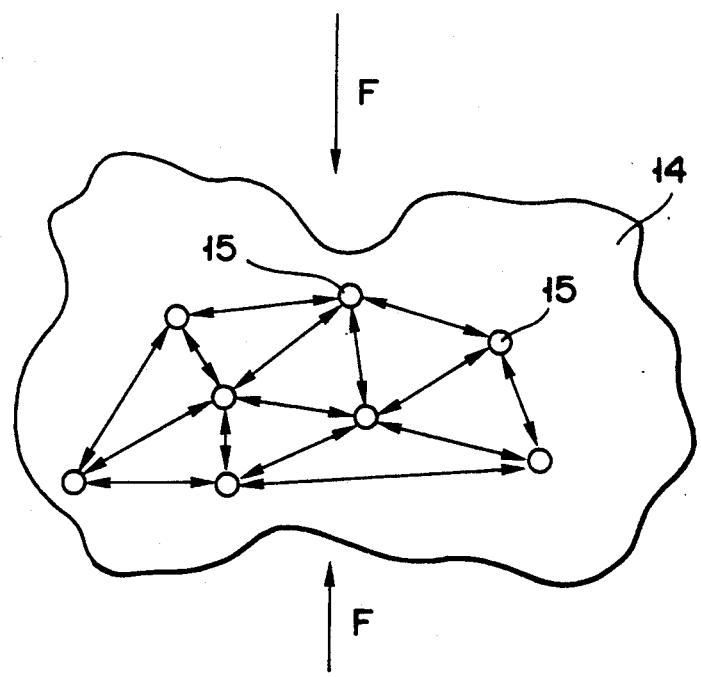
F I G. 4B

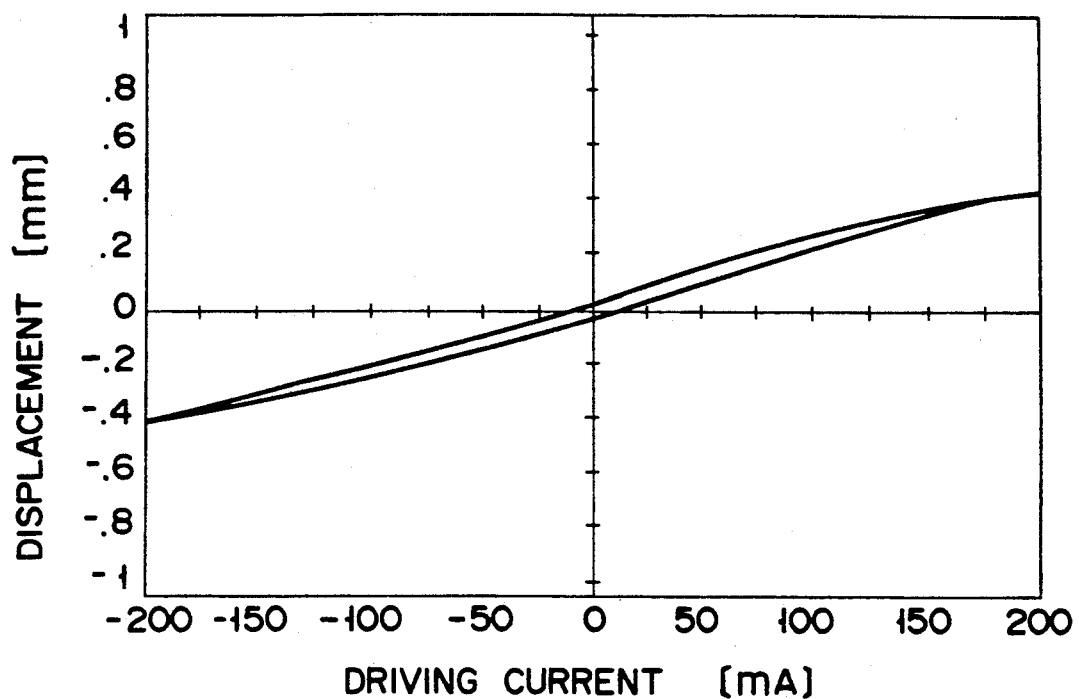
F I G. 5A
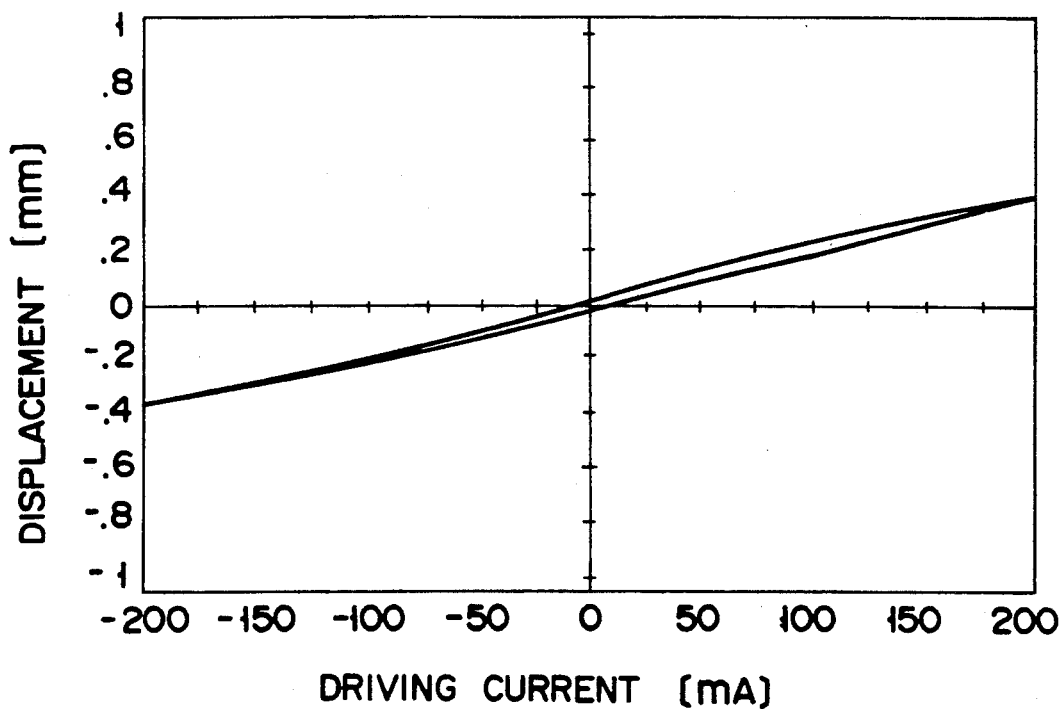
F I G. 5B

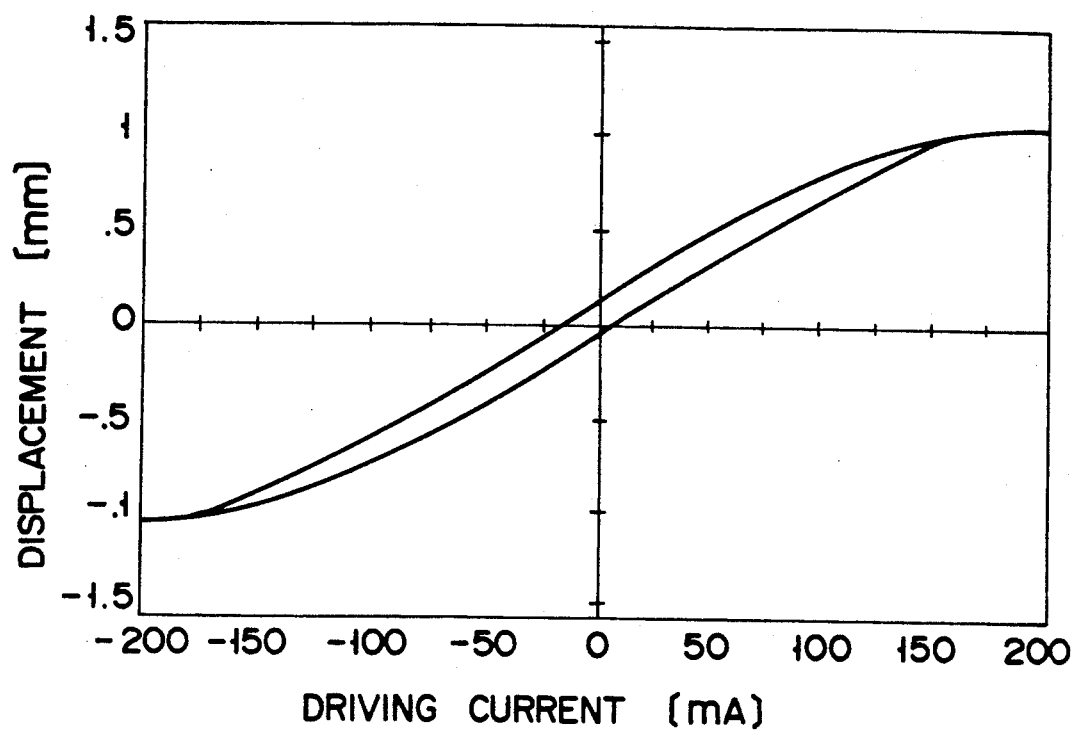
F I G. 6A
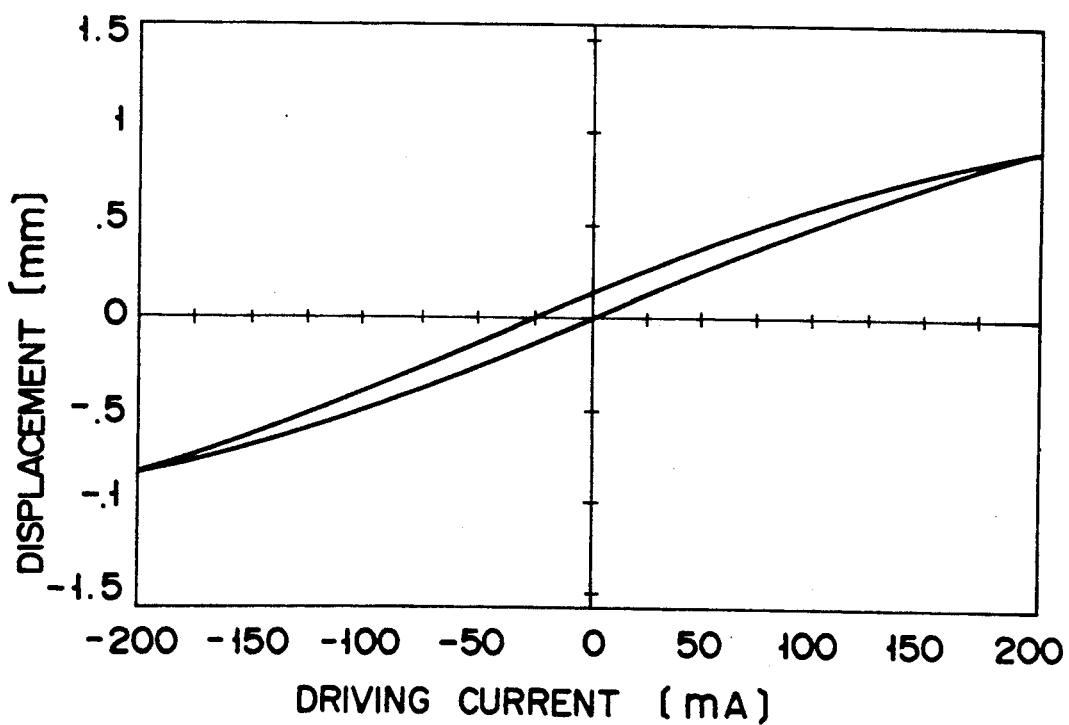
F I G. 6B

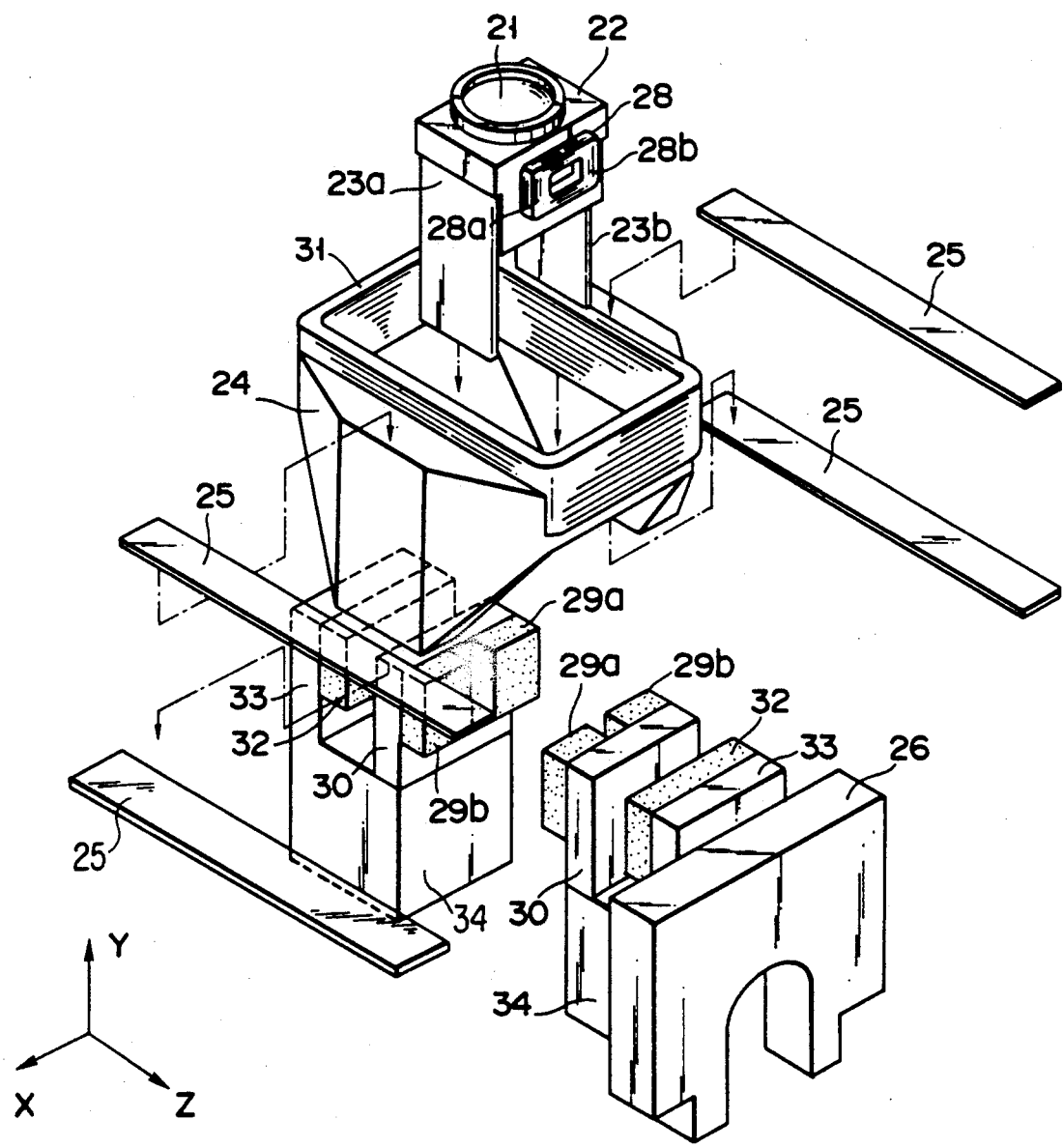
F I G. 7

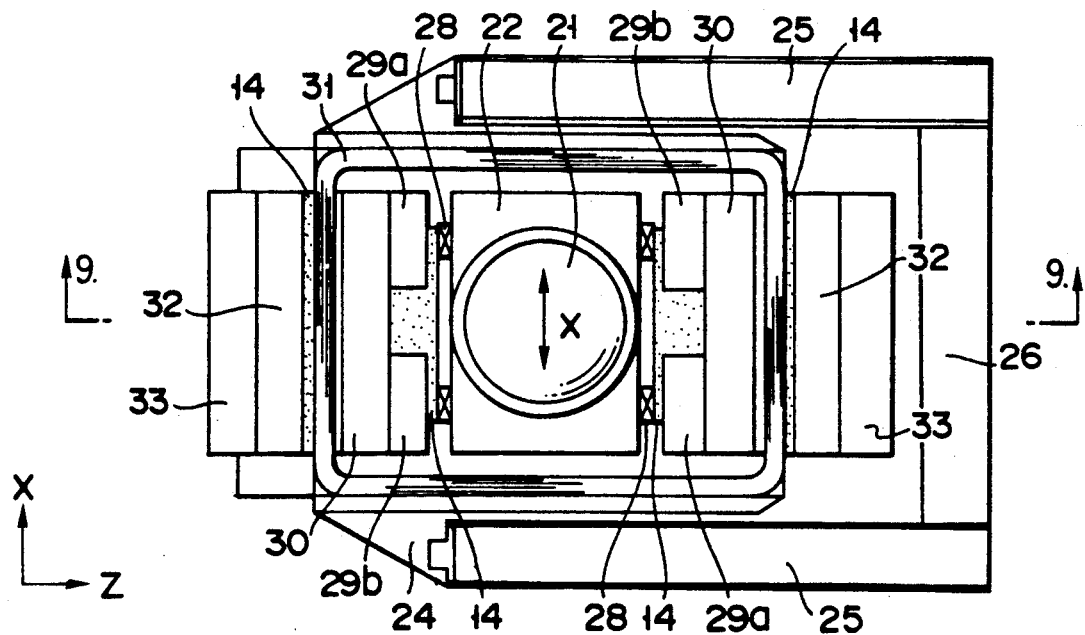
F I G. 8
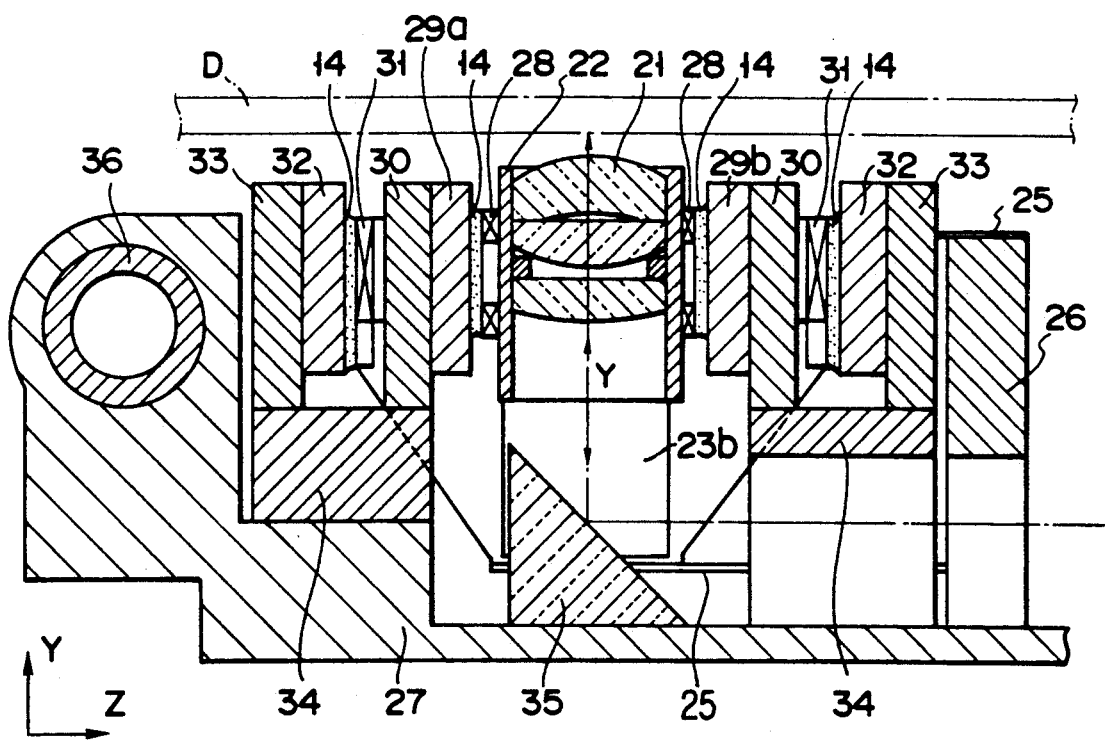
F I G. 9

VISCOELASTIC SUBSTANCE AND OBJECTIVE LENS DRIVING APPARATUS WITH THE SAME

BACKGROUND OF THE INVENTION

1. Field of the Invention

The present invention relates to a viscoelastic substance and an objective lens driving apparatus used in an optical disk apparatus and provided with the substance.

2. Description of the Related Art

Optical disk apparatuses, for use as optical information processing apparatuses, are characterized by their information storage capacities much greater than those of conventional magnetic recording apparatuses, and are presently used in various fields of application. Principally, these optical disk apparatuses have modern technical problems that they should be able to access desired information quickly and accurately, and to offer the information to users without delay.

In order to quickly and accurately access recorded information on an optical disk, an objective lens must be quickly driven in the focusing or tracking direction of the disk. A semiconductor laser may be used as the light source. Many technical improvements have already been made on electromagnetic drive elements (e.g., voice-coil motor formed of a coil and a magnetic circuit) for driving the objective lens, so that the lens can enjoy a sufficient driving force.

On the other hand, the objective lens, which can be moved by means of such a sufficient driving force, must be positioned (or stopped) quickly and accurately at a predetermined position. This is a second requirement for the quick and accurate access to the information on the optical disk. More specifically, fine residual vibrations produced in the objective lens must be removed for the quick and accurate positioning of the lens. As regards this requirement, however, there still is much room for improvement, and various investigations are presently being made on the removal of fine vibrations.

According to one of conventional methods for removing fine vibrations of the objective lens, a magnetic fluid is interposed between a coil on the movable side and a magnetic circuit on the fixed side. In this arrangement, the viscosity resistance of the magnetic fluid accelerates a damping effect between movable and fixed parts, so that fine vibrations of the movable part can be absorbed at once. Due to the influence of a magnetic field generated by the magnetic circuit, moreover, the magnetic fluid can stay in magnetic gaps, so that the damping effect can be maintained for a long period of time.

Using the magnetic fluid, however, a conventional objective lens driving apparatus has the following problems. Since the magnetic fluid has a very great surface tension, it will gradually escape from the magnetic gaps if the gaps are relatively long. Moreover, the fluid may possibly evaporate or scatter during the operation of the optical disk apparatus. During prolonged use, therefore, the magnetic fluid is also likely to escape gradually from the magnetic gaps. Such an escape of the magnetic fluid is also attributable to a relatively small magnetic force of the magnetic circuit which is designed for the drive of the objective lens.

Thus, with use of the magnetic fluid, a prolonged, steady vibration damping effect cannot be expected. Since the viscosity of the magnetic fluid greatly changes depending on a temperature change, furthermore, the vibration damping effect also changes. It is therefore difficult to use the magnetic fluid within a practical range of working temperature ($-15$ to $+60°$ C.). Thus, the objective lens driving apparatus cannot easily effect control for the quick and accurate access to the target information.

SUMMARY OF THE INVENTION

The present invention has been contrived in consideration of these circumstances, and its object is to provide a viscoelastic substance and an objective lens driving apparatus which facilitates control for a quick and accurate access to target information.

In order to achieve the above object, according to the present invention, there is provided an objective lens driving apparatus which comprises: an objective lens through which a light beam is applied to a predetermined position on an optical disk; a movable member holding the objective lens; a coil mounted on the movable member; a magnetic circuit for applying a magnetic field to the coil and driving the objective lens in a predetermined direction with respect to the optical disk; and a viscoelastic substance having a magnetic material dispersed therein and arranged between the coil and the magnetic circuit, for absorbing vibration of the movable member.

According to the objective lens driving apparatus constructed in this manner, the use of the viscoelastic substance not only produces a great damping effect, but also leads to an improvement in hysteretic characteristic or the relationship between force and displacement. Thus, a prolonged, steady vibration damping effect can be expected, and control for a quick and accurate access to target information is facilitated.

BRIEF DESCRIPTION OF THE DRAWINGS

FIGS. 1 to 6B show an objective lens driving apparatus according to a first embodiment of the present invention, in which FIG. 1 is a plan view of the apparatus, FIG. 2 is a sectional view taken along line A—A of FIG. 1, FIG. 3 is a perspective view of the apparatus, FIG. 4A is a diagrammatic view showing a viscoelastic substance in a normal state, FIG. 4B is a diagrammatic view showing the viscoelastic substance in vibration, FIG. 5A is a diagram showing a hysteretic characteristic of a viscoelastic substance containing no magnetic particles, with respect to a tracking direction, FIG. 5B is a diagram showing a hysteretic characteristic of a viscoelastic substance containing magnetic particles, with respect to the tracking direction, FIG. 6A is a diagram showing a hysteretic characteristic of the viscoelastic substance containing no magnetic particles, with respect to the focusing direction, and FIG. 6B is a diagram showing a hysteretic characteristic of the viscoelastic substance containing the magnetic particles, with respect to the focusing direction;

FIGS. 7 to 9 show an objective lens driving apparatus according to a second embodiment of the invention, in which, FIG. 7 is an exploded perspective view of the apparatus, FIG. 8 is a plan view of the apparatus, and FIG. 9 is a sectional view taken along line B—B of FIG. 8;

DETAILED DESCRIPTION OF THE PREFERRED EMBODIMENTS

Preferred embodiments of the present invention will now be described with reference to the accompanying drawings.

Figure 3:
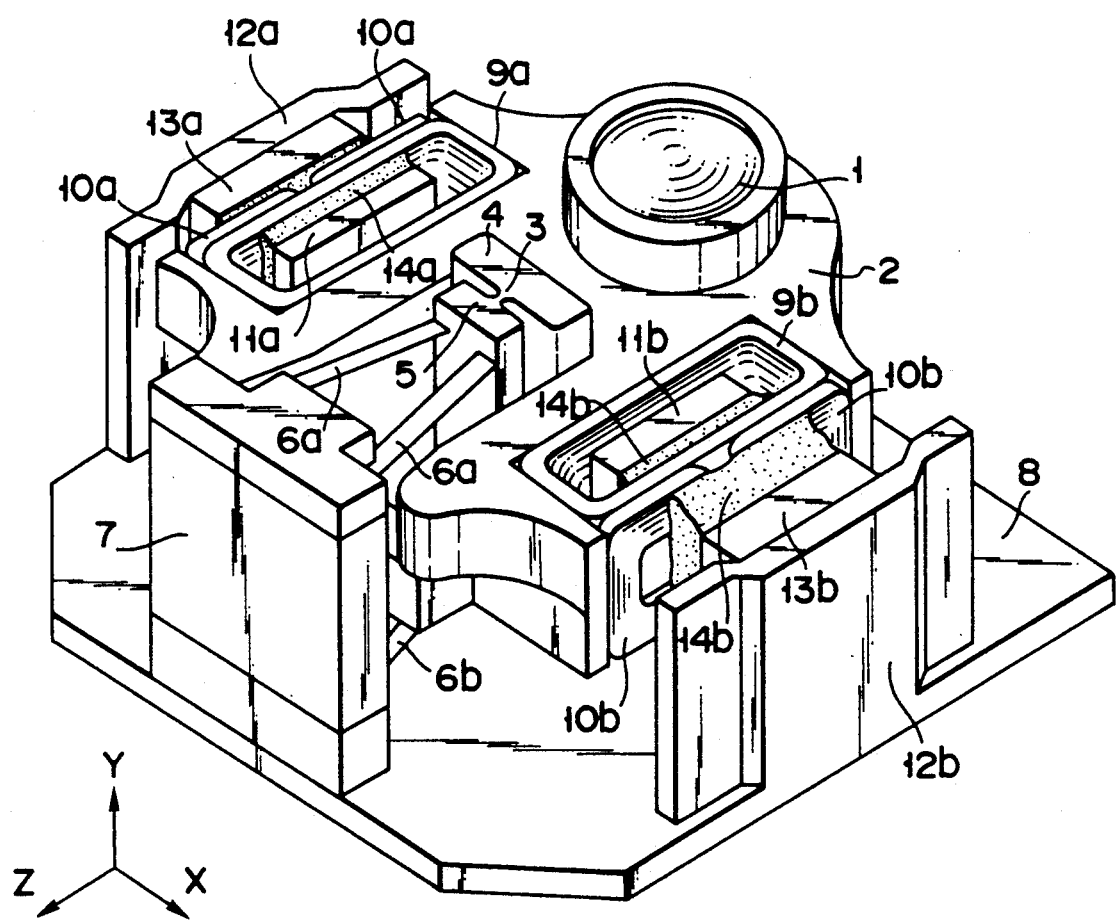

FIGS. 1 to 3 show an objective lens driving apparatus according to a first embodiment of the present invention. The driving apparatus comprises objective lens 1, through which a light beam from a light source (not shown) is applied to optical disk D, thereby recording information on or reproducing information from the disk. Lens 1, which is fixed to movable member 2, is located at a predetermined distance from center M of inertia of member 2. Elastic hinge 3, which is disposed on center M of movable member 2, has an axis of rotation parallel to the optical axis of objective lens 1. Movable portion 4 of hinge 3 is fixed to movable member 2 by press fit or adhesive bonding. Proximal portion 5 of hinge 3 is supported on fixed member 7 by means of two pairs of leaf springs 6a and 6b, which extend substantially at right angles to the optical axis of lens 1. Fixed member 7 is set upright on base 8, which is formed of a magnetic material.

Thus, objective lens 1 is supported so as to be rotatable together with movable member 2, for a predetermined angle around center M of inertia, by the action of hinge 3, and movable along the optical axis of lens 1 by elastic deformation of leaf springs 6a and 6b. Base 8 is supported so as to be movable in the radial direction of disk D by means of guide rails (not shown) or the like.

Focusing coils 9a and 9b are fixed to those portions of movable member 2 symmetrical with respect to center M of inertia. Likewise, two pairs of tracking coils 10a and 10b are fixed to member 2 so as to be symmetrical with respect to center M. Each of focusing coils 9a and 9b is wound around an axis parallel to the optical axis of objective lens 1, i.e., Y-axis. Tracking coils 10a and 10b, which are wound around the X-axis perpendicular to the Y-axis, are arranged outside focusing coils 9a and 9b.

A pair of inner yokes 11a and 11b, which are set up on base 8, are inserted in focusing coils 9a and 9b, respectively, with predetermined gaps (magnetic gaps) between them. Further, a pair of outer yokes 12a and 12b are set up on base 8 so as to be located on either side of movable member 2. Outer yoke 12a and inner yoke 11a face each other with coils 9a and 10a and a predetermined gap between them. Likewise, outer yoke 12b and inner yoke 11b face each other with coils 9b and 10b and a predetermined gap between them. Permanent magnets 13a and 13b are fixed to those surfaces of outer yokes 12a and 12b which face inner yokes 11a and 11b, respectively. Each magnet is magnetized in the longitudinal direction of the magnetic gap between its corresponding outer yoke 12a or 12b and tracking coils 10a or 10b. Thus, inner yokes 11a and 11b, outer yokes 12a and 12b, permanent magnets 13a and 13b, and base 8 constitute a magnetic circuit.

Viscoelastic substances 14a are arranged individually in the gaps between permanent magnet 13a and tracking coils 10a and between focusing coil 9a and inner yoke 11a. Likewise, viscoelastic substances 14b are arranged individually in the gaps between magnet 13b and coils 10b and between inner yoke 11b and coil 9b. Substances 14a and 14b are formed of a gel, for example. In this embodiment, a gel containing silicone is used for the viscoelastic substances. For example, the material may be YE5818 or YSE3051 produced by Toshiba Silicone Co., Ltd. or SE1890 produced by Toray Silicone Co., Ltd. Magnetic particles 15, such as ferrite particles or barium ferrite particles, are dispersed in viscoelastic substances 14a and 14b. It is to be understood that any other materials than the aforesaid ones may be used for the viscoelastic substances and magnetic particles 15.

According to the objective lens driving apparatus constructed in this manner, movable member 2 is moved in the Y-direction by electromagnetic force generated by energizing focusing coils 9a and 9b. Thereupon, objective lens 1 can be subjected to focusing control.

By electromagnetic force generated by energizing tracking coils 10a and 10b, movable member 2 is rotated around Y-axis. Thereupon, objective lens 1 can be subjected to tracking control. By positioning lens 1 in this manner, a target information track of optical disk D can be accessed.

The magnetic gaps between the permanent magnet and the tracking coils and between the focusing coil and the inner yoke are filled up with viscoelastic substances 14a or 14b. The damping effect of these viscoelastic substances, for use as a damping material, is greater than that of a magnetic fluid. The use of viscoelastic substances 14a and 14b, moreover, produces a unique effect such that it improves the hysteretic characteristic (relationship between driving force and displacement) which conventionally is deteriorated as the damping effect is improved. This effect is not limited to the application of the present embodiment, and may also be obtained in the case where the viscoelastic substances are arranged between objects which are relatively displaced in places subjected to magnetism, or where the viscoelastic substances are magnetized before they are arranged between objects which are relatively displaced.

Viscoelastic substances 14a and 14b have such a peculiar characteristic for the following reasons. In a normal state (or when no external force is applied), as shown in the diagrammatic view of FIG. 4A, the positional relationships between magnetic particles 15 in the viscoelastic substances are kept stable. In case of vibration (or when external force F is applied), as shown in FIG. 4B, the viscoelastic substances are deformed, so that the stable positional relationships between magnetic particles 15 are broken. The viscoelastic substances are subjected not only to a restoring force attributable to their elasticity, but also to a restoring force attributable to the magnetic attraction between dispersed magnetic particles 15. Thus, a force is generated in a direction such that the state of FIG. 4A is restored and there is no vibration. Since magnetic particles 15 are coupled to their adjacent molecules of the viscoelastic substances, moreover, their relative positions cannot be shifted. Even though the external force acts on viscoelastic substances 14a and 14b, thereby producing vibration therein, in this manner, the magnetic attraction produces the restoring force to quickly restore the stable state, so that hysteresis can be effectively restrained. FIGS. 5A and 6A show experimental results of hysteretic characteristic comparison obtained with use of viscoelastic substances having no magnetic particles 15 therein, while FIGS. 5B and 6B show results obtained with use of viscoelastic substances having magnetic particles 15 dispersed therein. FIGS. 5A and 5B show a case in which movable member 2 is moved in the tracking direction, while FIGS. 6A and 6B show a case in which member 2 is moved in the focusing direction. The curves shown in these four drawings represent the relationships between driving current (mA) and displacement (mm). A testing apparatus used is quite similar to the objective lens driving apparatus shown in FIGS. 1 to 3. Table 1 shows testing conditions.

TABLE 1

| Viscoelastic Substances: | YE5818 (Toshiba Silicone Co., Ltd.) |
|---|---|
| Magnetic Particles: | Barium ferrite |
| Rate of Dispersion of Magnetic Particles: | 1% by weight |
| Room Temperature: | 23° C. |
| Humidity: | 35% |

The difference in displacement at 0 mA between the hysteresis curves of FIG. 5A is 41 μm, and that between the curves of FIG. 5B is 33 μm. Thus, comparison between FIGS. 5A and 5B indicates that the hysteresis is eased by the use of viscoelastic substances 14a and 14b. Further, the difference in displacement at 0 mA between the hysteresis curves of FIG. 6A is 147 μm, and that between the curves of FIG. 6B is 102 μm. Also in this case, comparison between FIGS. 6A and 6B indicates a remarkable effect of the use of viscoelastic substances 14a and 14b. This unique effect can be detected despite changes of the various testing conditions, including the kind and dispersion ratio of the materials.

The magnetic gaps between permanent magnets 13a and 13b and tracking coils 10a and 10b and between focusing coils 9a and 9b and inner yokes 11a and 11b are too wide to securely hold conventional magnetic fluids, so that comparison related to us of the magnetic fluids in the same apparatus cannot be made. In general, however, a magnetic fluid cannot produce so great a damping effect as that of the viscoelastic substances. Thus, there is a great difference between the effects of the magnetic fluid and the viscoelastic substances.

Such a novel property of viscoelastic substances 14a and 14b can minimize fine vibrations, such as sympathetic vibrations, produced in movable member 2 of the objective lens driving apparatus. Since objective lens 1 can be positioned in an instant, moreover, the time for the access to the target information on the optical disk is reduced, thus ensuring high-speed, high-accuracy control.

As mentioned before, the viscoelastic substances are located in the magnetic gaps. Thus, those regions which conventionally are magnetic gaps or voids can be replaced with the viscoelastic substances. Since magnetic particles 15 are dispersed in the viscoelastic substances, furthermore, magnetic flux passes through particles 15 without passing through air which has a great magnetic reluctance. Even though the length of the magnetic gaps is increased, therefore, the magnetic flux of the magnetic circuit can be effectively utilized. As the magnetic flux crossing the coils increases, the driving force of movable member 2 can be increased. Since viscoelastic substances 14a and 14b and magnetic particles 15 are electrically nonconductive, and therefore, are electrically insulated, they can be brought into contact with the coils without any trouble. Although the viscoelastic substances are disposed between the coils and the magnetic circuit, they may alternatively be disposed, with the same result, between objects which are relatively displaced in places subjected to magnetism, as mentioned before. Alternatively, moreover, the viscoelastic substances may be magnetized before they are arranged between objects which are relatively movable. In this case, the viscoelastic substances can produce the aforesaid effects without being located in any places which are subjected to magnetism.

FIGS. 7 to 9 show an objective lens driving apparatus according to a second embodiment of the present invention. Objective lens unit 21, which includes a plurality of objective lenses and a body tube supporting the lenses, is held by means of movable member 22 which includes a cylindrical lens retaining portion and a cubic housing. Two tracking springs (leaf springs) 23a and 23b are fixed individually to two opposite side faces of movable member 22. Facing each other, springs 23a and 23b extend parallel to the optical axis of lens unit 21. Movable member 22 is passed through hollow intermediate frame 24, and the respective lower ends of springs 23a and 23b are fixed to the inside of frame 24. Member 22 is supported by springs 23a and 23b so that it can move relatively to intermediate frame 24, in the tracking direction (X-direction) which intersects the optical axis of objective lens unit 21. Four focusing springs (leaf springs) 25, which extend parallel to one another in the Z-direction, are fixed individually the upper and lower surfaces of the opposite end portions of frame 24. One end of each spring 25 is fixed to fixed frame 26. Intermediate frame 24 is supported by leaf springs 25 so that it can move in the focusing direction (Y-direction) along the optical axis of lens unit 21. Fixed frame 26 is fixed to the upper surface of sub-chassis 27.

Tracking coils 28, which are each wound in the form of a rectangular frame, are fixed individually to the two remaining side faces of movable member 22, which intersects tracking springs 23a. Each coil 28 is wound around an axis perpendicular to the optical axis of objective lens unit 21. Permanent magnets 29a and 29b are opposed to straight portions 28a and 28b, respectively, of each tracking coil 28 through which electric current flows in the Y-direction. Each pair of magnets 29a and 29b are magnetized in opposite directions, and are fixed to yoke 30. Yokes 30 are fixed to pedestals 34, respectively, which are fixedly mounted on sub-chassis 27. One of the pedestals 34 is located between fixed frame 26 and movable member 22.

Focusing coil 31 is embedded in intermediate frame 24 by injection molding or the like. Coil 31 is wound in the form of a rectangular frame around the optical axis of objective lens unit 21 so that electric current flows in the X-direction perpendicular to the optical axis. Movable member 22, tracking coils 28, permanent magnets 29a and 29b, and yokes 30 are arranged inside focusing coil 31. Permanent magnets 32 are opposed individually to the outer side faces of coil 31. Each magnet 32 is retained by means of yoke 33. Each yoke 33 is fixed to the corresponding pedestal 34 and located outside of focusing coil 31.

Further, mirror 35 is fixed on sub-chassis 27. A laser beam emitted from a light source, such as a laser diode (not shown), is passed through the respective hollows of fixed frame 26 and pedestal 34, and is reflected by mirror 35 to be delivered to objective lens unit 21.

Sleeve 36 is fixed to an end portion of sub-chassis 27 and slidably fitted on a guide shaft (not shown). Sub-chassis 27 is guided by the guide shaft to trace the track on optical disk D.

The gaps between tracking coils 28 and permanent magnets 29a and 29b and between focusing coil 31 and permanent magnets 32 are each filled up with viscoelastic substance 14 which contains magnetic particles.

The following is a description of the second embodiment with the aforementioned arrangement.

In an optical disk apparatus incorporating the objective lens driving apparatus, optical disk D is rotated by means of a motor (not shown), and sub-chassis 27 is moved in the direction perpendicular to the drawing plane of FIG. 9, thereby effecting playback operation.

The laser beam emitted from the laser diode in the optical system is reflected by mirror 35, and is transmitted through objective lens unit 21 to be applied to a recording surface of optical disk D. A reflection of the laser beam from the recording surface is returned to an original path by mirror 35, and is detected by a photodiode in the optical system. The detected light is subjected to photoelectric conversion so that digital information recorded on the recording surface of disk D can be read.

In the playback operation described above, an error in the condition of application of the laser beam, compared with an ideal condition, is detected by processing the light detected by means of the photodiode. A resulting error detection signal is transmitted to focusing coil 31 and tracking coils 28 by means of a coil driver circuit. When electric current flows in the X-direction through focusing coil 31, intermediate frame 24 is driven in the Y-direction by an electromagnetic force produced between this current and magnetic fields directed from permanent magnets 32 to yokes 33. Accordingly, the laser beam radiated from objective lens unit 21 is corrected so that its spot is always focused on the recording surface of optical disk D. When current flows in the Y-direction through straight portions 28a and 28b of tracking coils 28, movable member 22 is driven in the X-direction by an electromagnetic force produced between this current and magnetic fields formed by permanent magnets 29a and 29b to yokes 30. By this operation, the laser beam spot is corrected so as to trace the track on the recording surface of disk D with accuracy.

In the objective lens driving apparatus according to the present embodiment, the damping effect of viscoelastic substance 14, for use as a damping material, is greater not only than that of a magnetic fluid but also than that of a conventional viscoelastic substance. The use of viscoelastic substance 14, moreover, produces a unique effect such that it improves the hysteretic characteristic which conventionally is deteriorated as the damping effect is improved. Such a novel property of viscoelastic substance 14 can minimize fine vibrations, such as sympathetic vibrations, produced in movable member 22 of the objective lens driving apparatus. Since objective lens unit 21 can be positioned in an instant, furthermore, the time for the access to the target information on optical disk D is reduced, thus ensuring high-speed, high-accuracy control.

Figure 10:
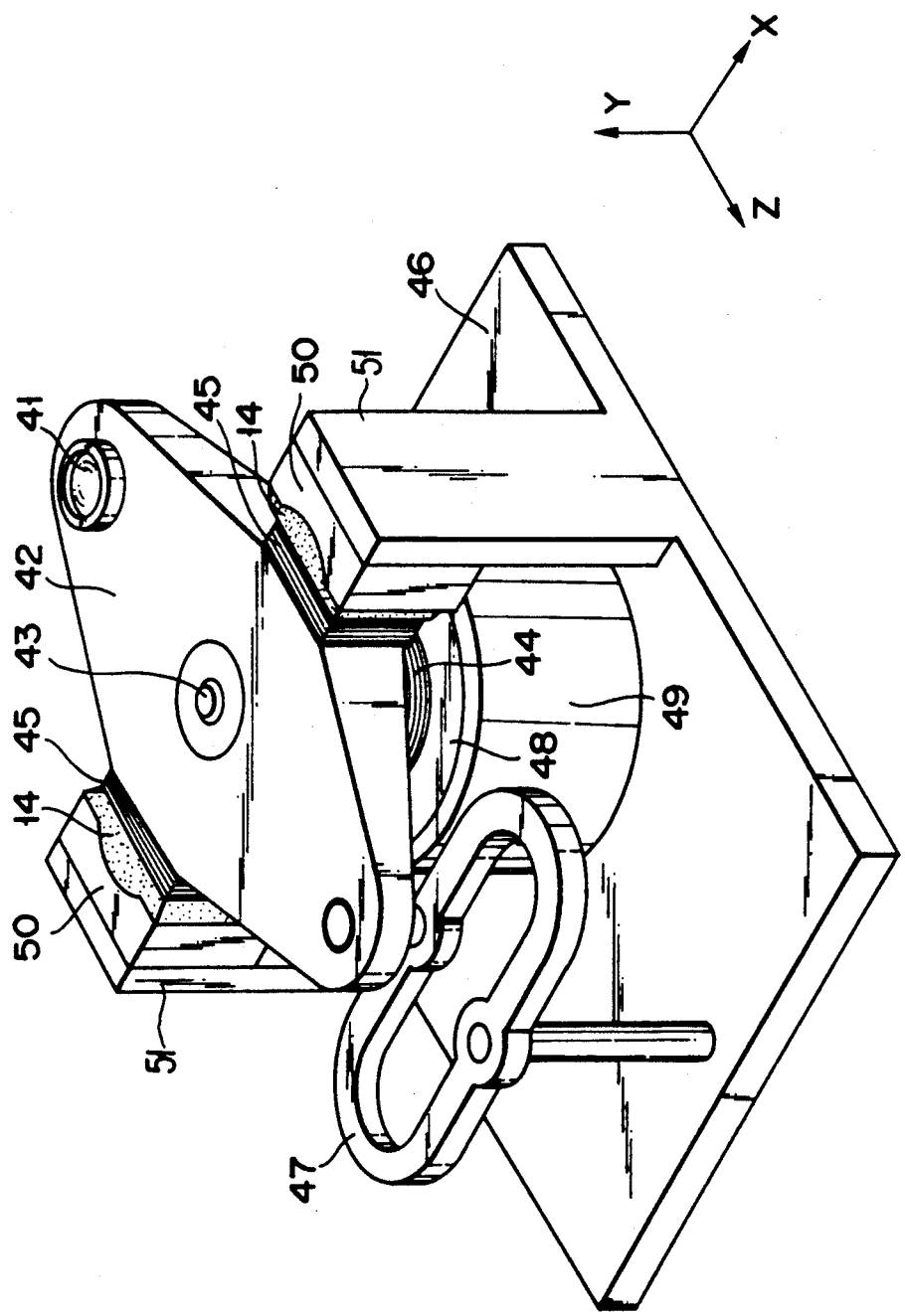
FIG. 10 is a perspective view of an objective lens driving apparatus according to a third embodiment of the invention.

FIG. 10 shows an objective lens driving apparatus according to a third embodiment of the present invention. In the apparatus of this embodiment, objective lens 41 is guided by means of a slide bearing so that it can be driven in a predetermined direction. Lens 41 is fixed to movable member 42. Member 42 is supported by means of supporting shaft 43 which is set up on base 46 and extends parallel to the optical axis of lens 41. Thus, objective lens 41, along with movable member 42, can both slide in the axial direction of shaft 43 and rotate around shaft 43, that is, it can enjoy a two-dimensional movement. Movable member 42 is fixedly mounted with focusing coil 44 wound around shaft 43 and a pair of tracking coils 45 arranged symmetrically with respect to shaft 43, as well as objective lens 41. Each coil 45 is wound in the form of a rectangular frame around an axis perpendicular to shaft 43. Further, movable member 42 is connected to base 46 by means of elastic suspension 47 so that the motion of member 42 is subject to a restoring force.

The axial movement of movable member 42, in the Y-direction or the focusing direction of objective lens 41, is caused by an electromagnetic force produced between electric current flowing through focusing coil 44, attached to the lower part of member 42, and a focusing magnetic circuit which is formed of permanent magnet 48 and yoke 49 mounted on base 46. The drive of movable member 42 in the X-direction or the tracking direction is caused by a couple of forces attributable to an electromagnetic force produced between electric current flowing through tracking coils 45 and a tracking magnetic circuit which is formed of permanent magnets 50 and yokes 51 mounted on base 46. A vibration system is constructed by the mass of all the moving parts and the springiness of suspension 47 for providing a mechanical neutral position in the two-dimensional movement. In this vibration system, however, only suspension 47 has a slight damping effect, which is not very satisfactory. Accordingly, undesired sympathetic vibrations cannot be sufficiently restrained during the operation, so that objective lens 41 cannot be positioned with ease.

For this reason, also in this embodiment, the gaps between focusing coil 44 and permanent magnet 48 and between tracking coils 45 and permanent magnets 50 are each filled up with viscoelastic substance 14 which contains magnetic particles. Thus, fine vibrations, such as sympathetic vibrations, produced in movable member 22 of the objective lens driving apparatus can be minimized. Since objective lens 41 can be positioned in an instant, moreover, the time for the access to the target information on optical disk D is reduced, thus ensuring high-speed, high-accuracy control.

Figure 11:
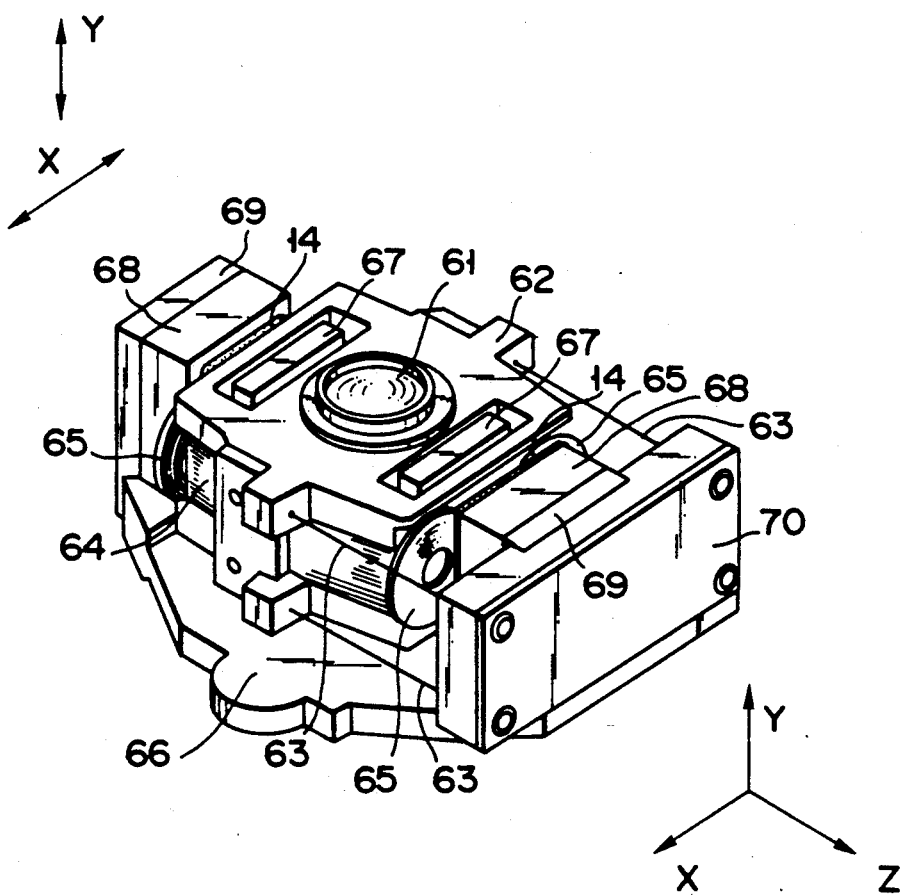
FIG. 11 is a perspective view of an objective lens driving apparatus according to a fourth embodiment of the invention.

FIG. 11 shows an objective lens driving apparatus according to a fourth embodiment of the present invention. The apparatus of this embodiment is constructed so that movable member 62 is connected to fixed portion 70 by means of four wires 63. This apparatus is driven in the same manner as the objective lens driving apparatuses according to the foregoing three embodiments. More specifically, the apparatus is driven by energizing focusing coil 64 and tracking coils 65 to which magnetic force is applied by means of a magnetic circuit. The magnetic circuit is formed of a pair of inner yokes 67, a pair of outer yokes 69, and permanent magnets 68 fixed individually to yokes 69, the inner and outer yokes protruding from base 66. Unless the straightness of wires 63 and the parallelism between the wires are satisfactory, in the objective lens driving apparatus of this type, undesired vibrations are produced during the drive in the focusing direction (Y-direction)

and the tracking direction (X-direction), so that the follow up performance of objective lens 61 to trace optical disk D is lowered.

In the present embodiment, therefore, the gaps between focusing coil 64 and yokes 67 and between tracking coils 65 and permanent magnets 68 are each filled up with viscoelastic substance 14 which contains magnetic particles. Thus, the aforementioned problems can be solved, and the objective lens driving apparatus can enjoy very high controllability.

The following is a further description of viscoelastic substance 14 which can be used in the various objective lens driving apparatuses described herein. In the above embodiments, the magnetic particles are first dispersed in a viscoelastic material, and the resulting substance is then made to gel, thereby ensuring accurate positioning. Since the magnetic gap length is so short that it is difficult to locate the viscoelastic substance with high viscosity in the magnetic gaps. In positioning the viscoelastic substance, therefore, the magnetic gaps are first filled before the viscosity of the substance becomes very high, and the substance is then allowed to gel. According to the present embodiment, the property of silicone gel that the bridging state of its molecules is changed by heating is utilized. After the heated viscoelastic substance is tentatively located in a desired position, it is heatset in this position to obtain a desired viscosity. Naturally, the substance may be made to gel by any other methods, depending on the material. The magnetic particles can be dispersed substantially uniformly in the viscoelastic substance when the viscosity of the substance is relatively low.

Although it is advisable to disperse the magnetic particles substantially uniformly, the effect shown in FIG. 4B can be obtained even when magnetic particles 15 are unevenly mixed with viscoelastic substance 14. Further, magnetic particles 15 are not restricted to any predetermined size, and irregular particles may be used with the same result.

If viscoelastic substance 14 used is adhesive, it cannot be slip out of the magnetic gaps even though it is subjected to a tensile, compressive, or shearing force. Thus, a steady vibration damping effect can be expected.

Viscoelastic substance 14 according to the present invention is not limited to the use in an objective lens driving apparatus. It can constitute a general vibration-proof apparatus if it is disposed between two or more objects which are displaced differently.

What is claimed is:

1. An objective lens driving apparatus comprising:
   an objective lens through which a light beam is applied to a predetermined position on an optical disk;
   a movable member for holding the objective lens;
   means for driving the objective lens in a predetermined direction with respect to the optical disk, the means for driving having a coil and a magnetic field forming means for applying a magnetic field to the coil, and the movable member being attached to one of the coil and the magnetic field forming means; and
   a viscoelastic substance having magnetic particles dispersed therein and arranged between the movable member and a fixed portion under the influence of the magnetic field, for absorbing vibration of the movable member wherein magnetic attractions between the magnetic particles generating a force for restoring deformation of the viscoelastic substance when an external force acts on the viscoelastic substance.

2. An apparatus according to claim 1, wherein said viscoelastic substance is obtained by dispersing the magnetic particles in a viscous material and changing the resultant material to gel.

3. An apparatus according to claim 1, wherein said viscoelastic substance is a substance whose modulus of elasticity irreversibly changes depending on a temperature change.

4. An apparatus according to claim 1, wherein said viscoelastic substance is electrically nonconductive.

5. An apparatus according to claim 1, wherein said viscoelastic substance is adhesive.

6. An objective lens driving apparatus comprising:
   an objective lens through which a light beam is applied to a predetermined position on an optical disk;
   a movable member for holding the objective lens;
   means for driving the objective lens in a predetermined direction with respect to the optical disk, the means for driving having a coil and a magnetic field forming means for applying a magnetic field to the coil, and the movable member being attached to one of the coil and the magnetic field forming means; and
   a magnetized viscoelastic substance having magnetic particles dispersed therein and arranged between the movable member and a fixed portion, for absorbing vibration of the movable member wherein magnetic attractions between the magnetic particles generating a force for restoring deformation of the viscoelastic substance when an external force acts on the viscoelastic substance.

7. An apparatus according to claim 6, wherein said viscoelastic substance is obtained by dispersing the magnetic particles in a viscous material and changing the resultant material to gel.

8. An apparatus according to claim 6, wherein said viscoelastic substance is a substance whose modulus of elasticity irreversibly changes depending on a temperature change.

9. An apparatus according to claim 6, wherein said viscoelastic substance is electrically nonconductive.

10. An apparatus according to claim 6, wherein said viscoelastic substance is adhesive.

11. An apparatus according to claim 6, wherein said viscoelastic substance is a gel consisting mainly of silicone.

12. An objective lens driving apparatus comprising:
    a base;
    an objective lens through which a light beam is applied to an optical recording medium;
    a movable member for holding the objective lens;
    supporting means for supporting the movable member to be movable along an optical axis of the objective lens with respect to the base;
    means for driving the movable member along the optical axis of the objective lens, the means for driving including magnetic field forming means for applying a magnetic field, and coil means situated in the magnetic field, for cooperating with the magnetic field, the coil means having a first coil wound around an axis parallel to the optical axis of the objective lens, the movable member being attached to one of the magnetic field forming means and coil means; and vibration absorbing means arranged between the coil means and the magnetic field forming means, for absorbing vibration of the movable member, said absorbing means including a viscoelastic substance having magnetic particles dispersed therein.

13. An apparatus according to claim 12, wherein said magnetic material of said vibration absorbing means constitutes a magnetic flux path between the coil means and the magnetic field forming means.

14. An apparatus according to claim 12, wherein said vibration absorbing means is held between the coil means and the magnetic field forming means by the magnetic attraction of the magnetic field acting on the magnetic material.

15. An apparatus according to claim 12, wherein said movable member is supported by the supporting means to be rotatable around a central axis parallel to the optical axis, and said coil means includes a pair of second coils arranged symmetrically with respect to the central axis and adapted to cause the movable member to rotate around the central axis.

16. An apparatus according to claim 15, wherein said magnetic field forming means includes a first yoke fixed to the base and passed through the first coil with a predetermined gap between the first coil and the first yoke, and said viscoelastic substance is arranged between the first coil and the first yoke.

17. An apparatus according to claim 16, wherein said magnetic field forming means includes a pair of second yokes fixed individually to the base and facing the second coils corresponding thereto, and a pair of magnets fixed individually to the second yokes and facing the second coils with a predetermined gap between each said second coil and each said magnet, and said viscoelastic substance is disposed between each said second coil and each said magnet.

18. A magnetic driving apparatus comprising:
a fixed portion;
a movable portion, movable relative to the fixed portion;
magnetic field forming means for applying a magnetic field to the movable portion; and
vibration absorbing means arranged between the movable portion and the fixed portion, in the magnetic field, for absorbing vibration of the movable portion, said absorbing means including a viscoelastic substance having magnetic particles dispersed therein wherein magnetic attractions between the magnetic particles generating a force for restoring deformation of the viscoelastic substance when an external force acts on the viscoelastic substance.

19. An objective lens driving apparatus comprising:
an objective lens through which a light beam is applied to a predetermined position on an optical disk;
a movable member for holding the objective lens;
means for driving the objective lens in a predetermined direction with respect to the optical disk, the driving means having a coil and a magnetic field forming means for applying a magnetic field to the coil, and the movable member being attached to one of the coil and the magnetic field forming means; and
a viscoelastic substance having magnetic particles dispersed therein and arranged between the coil and the magnetic field forming means, for absorbing vibration of the movable member wherein magnetic attractions between the magnetic particles generating a force for restoring deformation of the viscoelastic substance when an external force acts on the viscoelastic substance.

20. An apparatus according to claim 19, wherein said viscoelastic substance is obtained by dispersing the magnetic material in a viscous particles and changing the resultant material to gel.

21. An apparatus according to claim 19, wherein said viscoelastic substance is a substance whose modulus of elasticity irreversibly changes depending on a temperature change.

22. An apparatus according to claim 19, wherein said viscoelastic substance is electrically nonconductive.

23. An apparatus according to claim 19, wherein said viscoelastic substance is adhesive.

24. An apparatus according to claim 19, wherein said viscoelastic substance is a gel consisting mainly of silicone.

* * * * *